United States Patent
Kim

(10) Patent No.: US 9,352,633 B2
(45) Date of Patent: May 31, 2016

(54) ACTIVE SUSPENSION APPARATUS FOR VEHICLE

(71) Applicant: MANDO Corporation, Pyeongtaek-si, Gyeonggi-do (KR)

(72) Inventor: Tae Ju Kim, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/736,034

(22) Filed: Jun. 10, 2015

(65) Prior Publication Data

US 2015/0360532 A1     Dec. 17, 2015

(30) Foreign Application Priority Data

Jun. 11, 2014  (KR) .................. 10-2014-0071062

(51) Int. Cl.
| | | |
|---|---|---|
| *B60G 17/027* | (2006.01) | |
| *B60G 17/033* | (2006.01) | |
| *B60G 17/02* | (2006.01) | |
| *B60G 17/04* | (2006.01) | |
| *F16H 25/22* | (2006.01) | |

(52) U.S. Cl.
CPC ............ *B60G 17/021* (2013.01); *B60G 17/027* (2013.01); *B60G 17/0272* (2013.01); *B60G 17/033* (2013.01); *B60G 17/0408* (2013.01); *F16H 25/2204* (2013.01); *B60G 2204/8102* (2013.01); *B60G 2600/182* (2013.01)

(58) Field of Classification Search
CPC ............ B60G 17/021; B60G 17/0272; B60G 17/033; B60G 21/073; B60G 2202/413; B60G 2600/182; B60G 2204/8102; F16H 25/2204; F04B 1/02; F04B 1/124

USPC .................. 280/5.505, 5.5, 124.161, 124.16, 280/124.162; 701/37; 417/534

See application file for complete search history.

(56) References Cited

U.S. PATENT DOCUMENTS

| | | | |
|---|---|---|---|
| 6,000,702 A | | 12/1999 | Streiter |
| 6,024,366 A | * | 2/2000 | Masamura ......... B60G 17/0416 267/217 |
| 7,686,309 B2 | * | 3/2010 | Munday ................. B60G 21/06 280/5.504 |

(Continued)

FOREIGN PATENT DOCUMENTS

| | | |
|---|---|---|
| DE | 20 38 369 A1 | 6/1971 |
| DE | 42 31 641 A1 | 3/1994 |
| DE | 195 21 746 A1 | 12/1996 |

(Continued)

OTHER PUBLICATIONS

German Office Action issued in German Application No. 102015007479.2, dated Jan. 15, 2016.

*Primary Examiner* — Keith Frisby
(74) *Attorney, Agent, or Firm* — McDermott Will & Emery LLP

(57) ABSTRACT

An active suspension apparatus for a vehicle includes actuators configured to compensate displacements of coil springs connected to wheels of the vehicle, a first pump configured to supply a fluid to one of the actuators on left and right front wheels of the vehicle among the actuators, and a second pump configured to supply a fluid to one of the actuators on left and right rear wheels of the vehicle among the actuators, in which the fluid contained in one of cylinders of the first pump and the second pump is supplied to at least one of the actuators based on driving of a motor.

8 Claims, 8 Drawing Sheets

(56) References Cited

U.S. PATENT DOCUMENTS

2008/0257626 A1* 10/2008 Carabelli ............... B60G 13/14
                                                         180/165
2012/0305347 A1* 12/2012 Mori ...................... B60G 17/08
                                                        188/266.2

FOREIGN PATENT DOCUMENTS

| DE | 199 16 366 A1 | 10/2000 |
| DE | 101 11 551 A1 | 9/2002 |
| DE | 10 2006 002 983 A1 | 8/2007 |

* cited by examiner

ACTIVE SUSPENSION APPARATUS FOR VEHICLE

CROSS-REFERENCE TO RELATED APPLICATION

This application claims priority to and the benefit of Korean Patent Application No. 10-2014-0071062, filed on Jun. 11, 2014 the disclosure of which is incorporated herein by reference in its entirety.

BACKGROUND

1. Field of the Invention

The present invention relates to an active suspension apparatus for a vehicle, and more particularly, to an active suspension apparatus for a vehicle, which supplies a fluid to actuators disposed on wheels of the vehicle using a pump driven by a motor.

2. Discussion of Related Art

In vehicles, an active suspension system indicates a system in which sensors sense all types of inputs from a road surface and an electronic control unit (ECU) effectively controls the roll behavior of a vehicle based on the sensed inputs.

In detail, an actuator which compensates a displacement of a coil spring connected to a wheel of the vehicle is provided, a fluid quantity supplied to the actuator is appropriately controlled, and changes of the vehicle in rolling and pitching are sensed and a height of the vehicle is constantly maintained, thereby increasing comfortability and a grip force of the vehicle.

In addition, a user may be allowed to set the height of the vehicle depending on wheeling through level-controlling the height of the vehicle or the height of the vehicle may be lowered at a high speed to reduce air resistance, thereby increasing stability in driving and improving fuel efficiency.

U.S. Pat. No. 6,000,702 discloses an active vehicle suspension system which includes a spring and a lift-adjustable regulating unit connected thereto in series, in which a flow of a fluid supplied to the lift-adjustable regulating unit is controlled by a proportional control valve.

However, in such a system described above, the proportional control value and a hydraulic pump are expensive. In addition, the hydraulic pump is connected to an engine and always driven in such a way that the pump is constantly driven while the engine is operating. Accordingly, since the pump is always driven to generate a source of high pressure while the engine is operating, an excessive quantity not needed by the system is necessary and an output of the engine is reduced, thereby having a bad effect on fuel efficiency.

SUMMARY OF THE INVENTION

The present invention is directed to an active suspension apparatus in which an expensive proportion control valve is not applied to reduce manufacturing costs and to simplify a configuration.

The present invention is also directed to an active suspension apparatus capable of minimizing energy consumption using a motor-and-cylinder-based pump.

The technical objectives of the present invention are not limited to the above disclosure; other objectives not mentioned above may become apparent to those of ordinary skill in the art based on the following descriptions.

According to an aspect of the present invention, there is provided an active suspension apparatus for a vehicle. The active suspension apparatus includes actuators configured to compensate displacements of coil springs connected to wheels of the vehicle, a first pump configured to supply a fluid to one of the actuators of left and right front wheels of the vehicle among the actuators, and a second pump configured to supply a fluid to one of the actuators of left and right rear wheels of the vehicle among the actuators, in which the fluid contained in one of cylinders of the first pump and the second pump is supplied to at least one of the actuators based on driving of a motor.

Each of the first pump and the second pump may be independently operated.

The active suspension apparatus may further include a first flow channel and a third flow channel configured to connect the first pump with the actuators of the left and right front wheels of the vehicle and a second flow channel and a fourth flow channel configured to connect the second pump with the actuators of the left and right rear wheels of the vehicle, in which a valve configured to open and close a flow channel may be disposed on at least one of the first flow channel, the second flow channel, the third flow channel, and the fourth flow channel.

The active suspension apparatus may further include a first intersection flow channel configured to be for movements of the fluid between the actuator on the left front wheel and the actuator on the right rear wheel and a second intersection flow channel configured to be for movements of the fluid between the actuator on the right front wheel and the actuator on the left rear wheel.

An auxiliary valve configured to control the movements of the fluid may be disposed on at least one of the first intersection flow channel and the second intersection flow channel.

One of the first pump and the second pump may include a first ball screw and a second ball screw configured to be disposed on one side and the other side of the cylinder, respectively, and to rotate based on the driving of the motor, and a first piston and a second piston configured to linearly reciprocate inside the cylinder based on the rotation of the first ball screw and the second ball screw.

The first ball screw and the second ball screw may rotate on the same shaft. Also, when the first ball screw and the second ball screw rotate due to the driving of the motor in one of one direction and the other direction, the first piston and the second piston may move toward one of the one side and the other side of the cylinder and may supply the fluid contained in one of the one side and the other side of the cylinder to one of the actuators of the left wheels and the actuators of the right wheels.

One of the first pump and the second pump may further include a restoring unit configured to support at least one of the first piston and the second piston.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
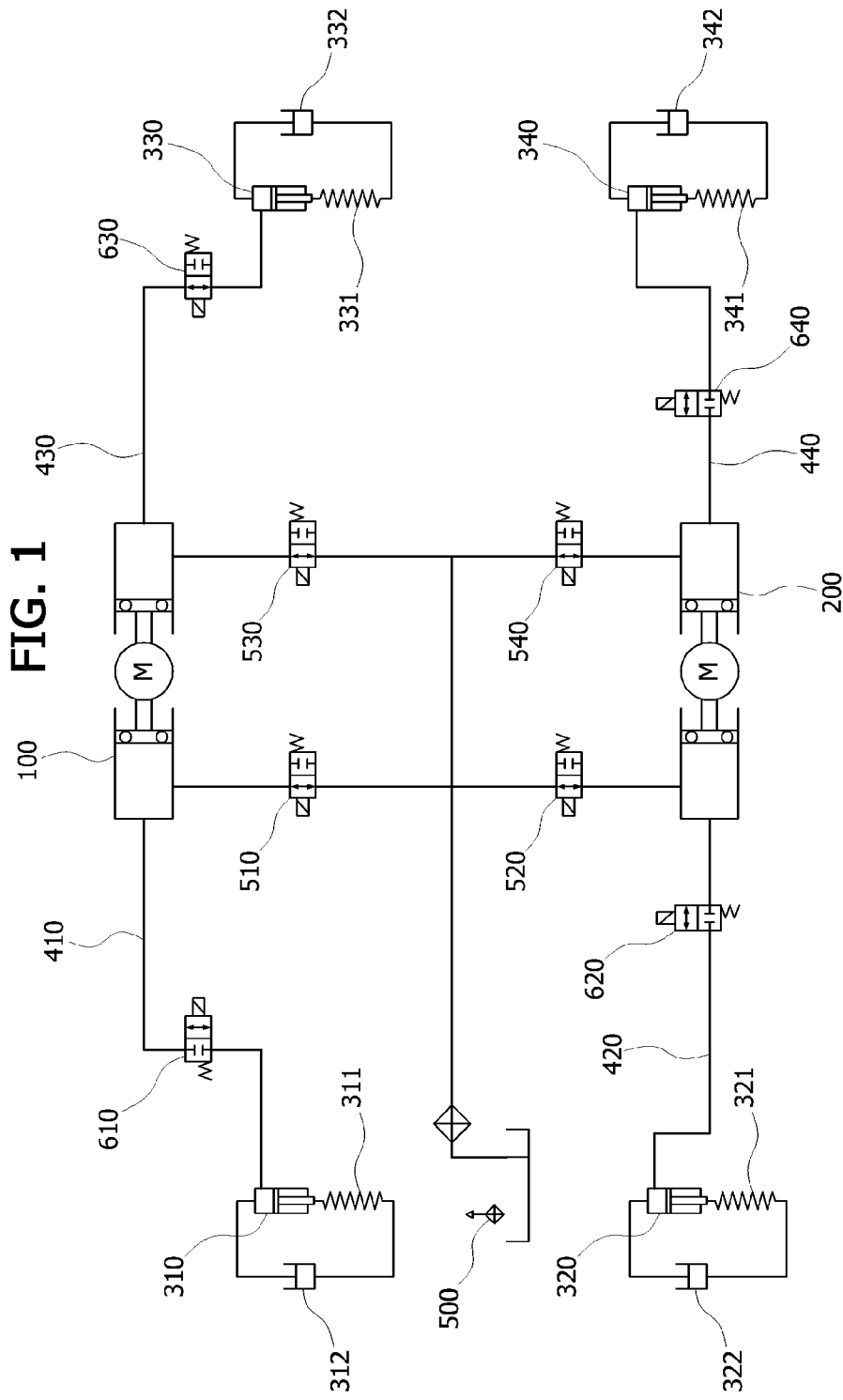
FIG. 1 is a circuit diagram of an active suspension apparatus for a vehicle according to an embodiment of the present invention.

Exemplary embodiments of the present invention will be described with reference to the drawings. Throughout the specification, like reference numerals designate like elements and a repetitive description thereof will be omitted.

While describing the embodiments, when it is determined that a detailed description of publicly known related art may make the points of the present embodiment unclear, the detailed description thereof will be omitted. Also, the attached drawings are only to allow the concept of the present invention to be easily understood. However, it will be understood that the concept of the present invention is not limited by the attached drawings.

Hereinafter, an active suspension apparatus for a vehicle according to an embodiment of the present invention will be described with reference to FIG. 1. FIG. 1 is a circuit diagram of the active suspension apparatus.

As shown in FIG. 1, the active suspension apparatus may include a first pump 100, a second pump 200, actuators 310, 320, 330, and 340, flow channels 410, 420, 430, and 440, a fluid reservoir 500, and valves 610, 620, 630, and 640.

The first pump 100 and the second pump 200 have a configuration for generating hydraulic pressure using a fluid used for the active suspension apparatus, which adjust movements of the fluid in the apparatus and are driven using a motor. In general, a pump in an active suspension apparatus for a vehicle is a hydraulic pump, connected to an engine, and always driven, thereby generating unnecessary pressure. However, when the configuration in which the pump is driven by the motor 110 is applied, since an electronic control unit transmits a signal to the motor 110 when necessary to selectively drive the pump, fuel efficiency is improved. Particularly, in case of the active suspension apparatus according to an embodiment of the present invention, as shown in FIG. 1, the two pumps 100 and 200 are used. The first pump 100 supplies the fluid to the actuator 310 of a left front wheel of the vehicle or the actuator 330 of a right front wheel of the vehicle. The second pump 200 supplies the fluid to the actuator 320 of a left rear wheel of the vehicle or the actuator 340 of a right rear wheel of the vehicle. That is, pumps which supply hydraulic pressure to the actuators 310 and 330 of the front wheels of the vehicle and the actuators 320 and 340 of the rear wheels of the vehicle are separately configured. Generally, to control a plurality of actuators using one pump, it is necessary to increase a capacity of the pump. However, since there is a limitation on an increase of the capacity of the pump due to a limitation on an output of a motor, a pump which supplies hydraulic pressure to the actuators 310, 320, 330, and 340 may be provided in a plurality thereof so that the active suspension apparatus according to an embodiment of the present invention increases the efficiency of a system. Also, the first pump 100 and the second pump 200 are cylinder type linear pumps which bidirectionally supply the fluid and may be independently driven by the electronic control unit. Detailed components of the first pump 100 and the second pump 200 will be described below.

The actuators 310, 320, 330, and 340, as shown in FIG. 1, are connected to coil springs 311, 321, 331, and 341, which are connected to the wheels of the vehicle, in series and receive the fluid from the pumps 100 and 200, and compensate displacements of the coil springs 311, 321, 331, and 341. The actuators 310, 320, 330, and 340 are disposed on the left front wheel, the left rear wheel, the right front wheel, and the right rear wheel of the vehicle, respectively. As described above, based on the driving of the motor 110, the first pump 100 supplies the fluid to the actuator 310 of the left front wheel or the actuator 330 of the right front wheel and the second pump 200 supplies the fluid to the actuator 320 of the left rear wheel or the actuator 340 of the right rear wheel. Also, the actuators 310, 320, 330, and 340 may be connected to dampers 312, 322, 332, and 342 to absorb shocks which occur while the vehicle is driving.

Meanwhile, between the first pump 100 and the second pump 200 and the actuators 310, 320, 330, and 340, the flow channels 410, 420, 430, and 440 through which the fluid moves are formed. As shown in FIG. 1, in the active suspension apparatus, there are formed a first flow channel 410 which connects the first pump 100 and the actuator 310 of the left front wheel, a third flow channel 430 which connects the first pump 100 and the actuator 330 of the right front wheel, a second flow channel 420 which connects the second pump 200 and the actuator 320 of the left rear wheel, and a fourth flow channel 440 which connects the second pump 200 and the actuator 340 of the right rear wheel.

Also, a valve which opens and closes a flow channel may be disposed on at least one of the first flow channel 410, the second flow channel 420, the third flow channel 430, and the fourth flow channel 440. In detail, as shown in FIG. 1, the valves 610, 620, 630, and 640 may be divided into a first valve 610 disposed on the first flow channel 410, a second valve 620 disposed on the second flow channel 420, a third valve 630 disposed on the third flow channel 430, and a fourth valve 640 disposed on the fourth flow channel 440. The electronic control unit may allow the fluid to be appropriately supplied to the actuators 310, 320, 330, and 340 by controlling not only the first pump 100 and the second pump 200 but also the opening and closing of the valves 610, 620, 630, and 640. Particularly, in the active suspension apparatus, on/off valves are applied instead of proportional control valves and operations of the on/off valves are controlled by the electronic control unit, thereby selectively controlling the movements of the fluid. Through this, a system configuration may be simplified and manufacturing costs may be reduced.

Also, the active suspension apparatus may further include the fluid reservoir 500. When a flow of the fluid in the active suspension apparatus exceeds, the fluid reservoir 500 contains and stores the exceeding flow of the fluid. When it is necessary to supply a more flow of the fluid to the actuators 310, 320, 330, and 340, the fluid reservoir 500 supplies the fluid to each of the actuators 310, 320, 330, and 340, the first pump 100, or the second pump 200. Between the fluid reservoir 500 and the first pump 100, an additional flow channel for the movement of the fluid may be formed. Also, another additional flow channel may be formed between the fluid reservoir 500 and the second pump 200. In addition, additional valves 510, 520, 530, and 540 which open and close the additional flow channels may be further provided.

Figure 2:
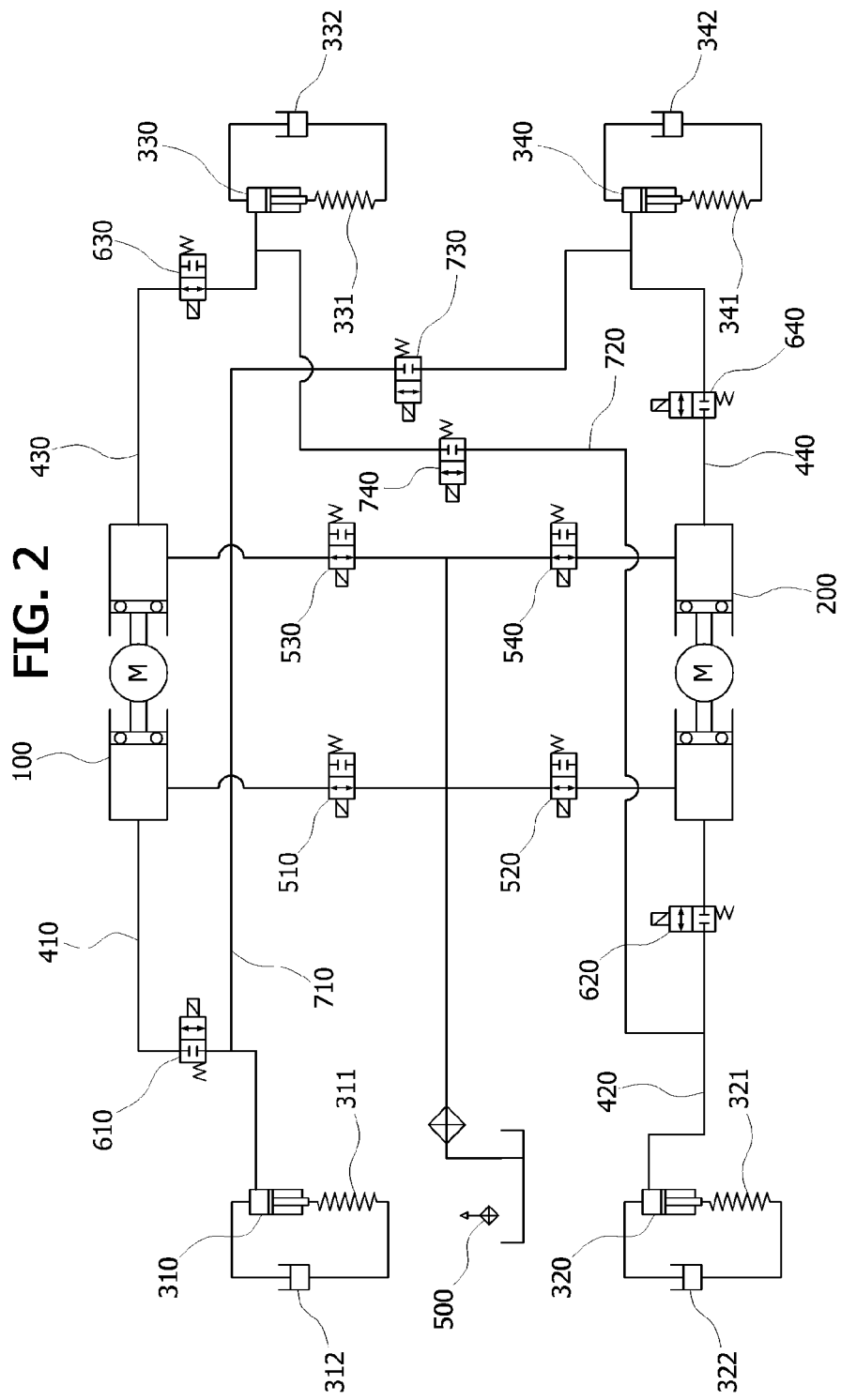
FIG. 2 is a circuit diagram of an active suspension apparatus for a vehicle according to another embodiment of the present invention.

Hereinafter, an active suspension apparatus for a vehicle according to another embodiment of the present invention will be described with reference to FIG. 2. FIG. 2 is a circuit diagram of the active suspension apparatus.

As shown in FIG. 2, compared with the active suspension apparatus according to an embodiment of the present invention, the active suspension apparatus according to another embodiment of the present invention further includes a first intersection flow channel 710 and a second intersection flow channel 720. In detail, the first intersection flow channel 710 is formed between the actuator 310 of the left front wheel and the actuator 340 of the right rear wheel to allow the fluid to move and the second intersection flow channel 720 is formed between the actuator 330 of the right front wheel and the actuator 320 of the left rear wheel to allow the fluid to move. It is possible to transfer an unnecessary hydraulic pressure source in the active suspension apparatus to a part which needs the hydraulic pressure source using the first intersection flow channel 710 and the second intersection flow channel 720, which will be described below in detail. Also, an auxiliary valve which controls the movement of the fluid may be disposed on at least one of the first intersection flow channel 710 and the second intersection flow channel 720. A first auxiliary valve 730 and a second auxiliary valve 740 may be disposed on the first intersection flow channel 710 and the second intersection flow channel 720, respectively.

Figure 3:
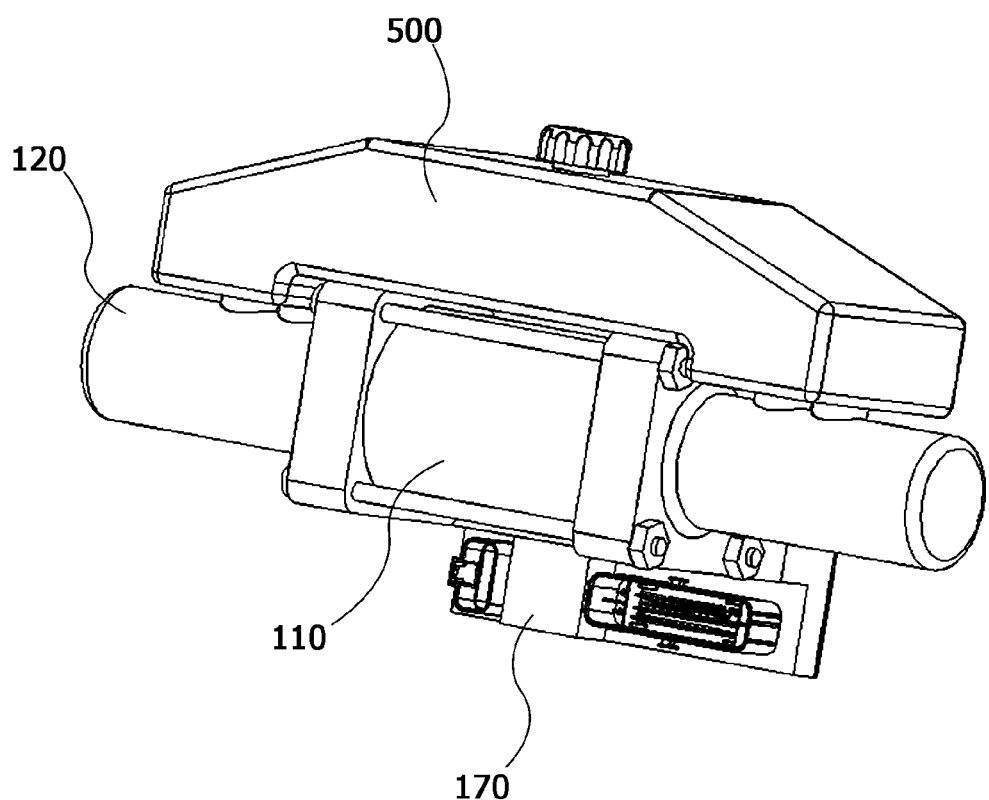
FIGS. 3 and 4 are a perspective view and a top view of a pump in the active suspension apparatuses according to the embodiments of the present invention.
Figure 4:
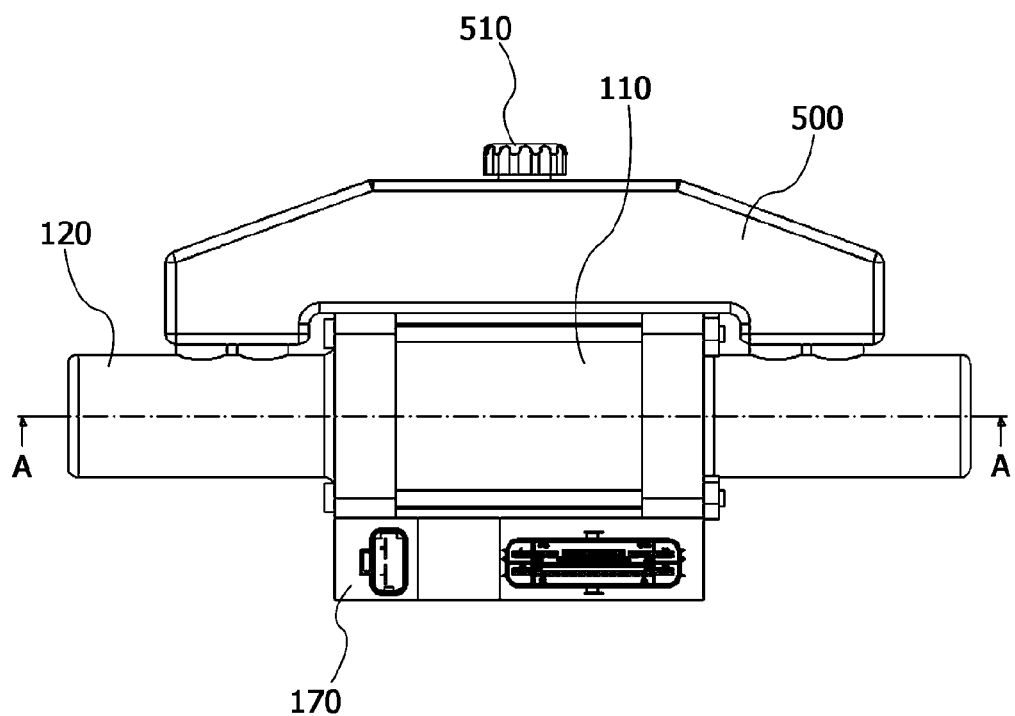
Figure 5:
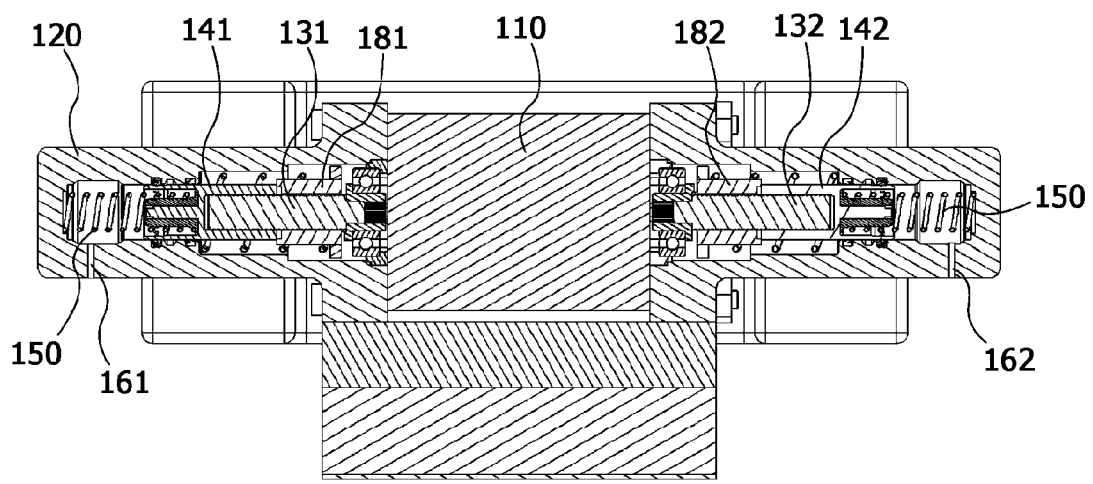
FIG. 5 is a cross-sectional view illustrating a portion taken along line A-A in FIG. 4.

Hereinafter, referring to FIGS. 3 to 5, the configuration and operation of the pumps 100 and 200 of the active suspension apparatus according to an embodiment of the present invention will be described in detail. FIGS. 3 and 4 are a perspective view and a top view of the pump 100 or 200 in the active suspension apparatus according to an embodiment of the present invention. FIG. 5 is a cross-sectional view illustrating a portion taken along line A-A in FIG. 4.

In the active suspension apparatus according to an embodiment of the present invention, the pumps 100 and 200 are linear cylinder type pumps driven by the motor 110 and each include the motor 110, the cylinder 120, a first ball screw 131, a second ball screw 132, a first piston 141, and a second piston 142.

The first ball screw 131 and the second ball screw 132 are disposed on one side and the other side of the cylinder 120 respectively and are rotated based on the driving of the motor 110 in the cylinder 120. The first piston 141 and the second piston 142 linearly reciprocate inside the cylinder 120 based on the rotation of the first ball screw 131 and the second ball screw 132. In detail, threads are formed on outer circumferences of the first ball screw 131 and the second ball screw 132 and grooves corresponding to the threads are formed on inner circumferences of a first ball nut 181 and a second ball nut 182 disposed corresponding to the first ball screw 131 and the second ball screw 132, thereby screw-coupling the first ball screw 131 and the second ball screw 132 with the first ball nut 181 and the second ball nut 182, respectively. Accordingly, when the first ball screw 131 and the second ball screw 132 are rotated by the motor 110, the first ball nut 181 and the second ball nut 182 linearly move toward the cylinder 120, thereby allowing the first piston 141 and the second piston 142 supported by the first ball nut 181 and the second ball nut 182 to reciprocate inside the cylinder 120.

Meanwhile, the first ball screw 131 and the second ball screw 132 are rotated on the same shaft, in which the first ball screw 131 and the second ball screw 132 share the shaft which transfers a rotational force of the motor 110. Through this, rotations of the first ball screw 131 and the second ball screw 132 are performed at the same speed. Also, when the first ball screw 131 and the second ball screw 132 are rotated by the driving of the motor 110 in one direction, the first piston 141 and the second piston 142 move toward the one side of the cylinder 120 and discharge the fluid contained in the one side of the cylinder 120 through a first outlet 161, thereby supplying the fluid to one of the actuators 310 and 320 of the left wheels and the actuators 330 and 340 of the right wheels. On the other hand, when the first ball screw 131 and the second ball screw 132 are rotated by the driving of the motor 110 in the other direction, the first piston 141 and the second piston 142 move toward the other side of the cylinder 120 and discharge the fluid contained in the other side of the cylinder 120 through a second outlet 162, thereby supplying the fluid to the other of the actuators 310 and 320 of the left wheels and the actuators 330 and 340 of the right wheels. That is, it is necessary for the first ball screw 131 and the second ball screw 132 to be rotated by the rotation of the motor 110 to allow the first piston 141 and the second piston 142 to linearly move in the same direction.

Meanwhile, the active suspension apparatus according to an embodiment of the present invention may further include a restoring unit 150 which supports at least one of the first piston 141 and the second piston 142. The restoring unit 150 is a kind of a component which performs a return spring function. Particularly, as shown in FIG. 5, the restoring units 150 are disposed between an inner end of the one side of the cylinder 120 and the first piston 141 and between an inner end of the other side of the cylinder 120 and the second piston 142, thereby maintaining the first piston 141 and the second piston 142 to be appropriately supported inside the cylinder 120.

Also, as shown in FIGS. 3 and 4, the fluid reservoir 500 may be formed together with the pumps 100 and 200 as a single body, in which the additional valves 510, 520, 530, and 540 are also formed together with the pumps 100 and 200 as a single body. Meanwhile, the fluid reservoir 500 may include an inlet through which the fluid is injected from the outside and may include a cap member capable of closing the inlet.

Meanwhile, since the pumps 100 and 200 of the active suspension apparatus according to an embodiment of the present invention are controlled by the electronic control unit as described above, a connection unit 170 which includes a connection terminal for receiving a signal from the electronic control unit and a power supply terminal for driving the motor 110 may be included as shown in FIGS. 3 and 4.

Figure 6:
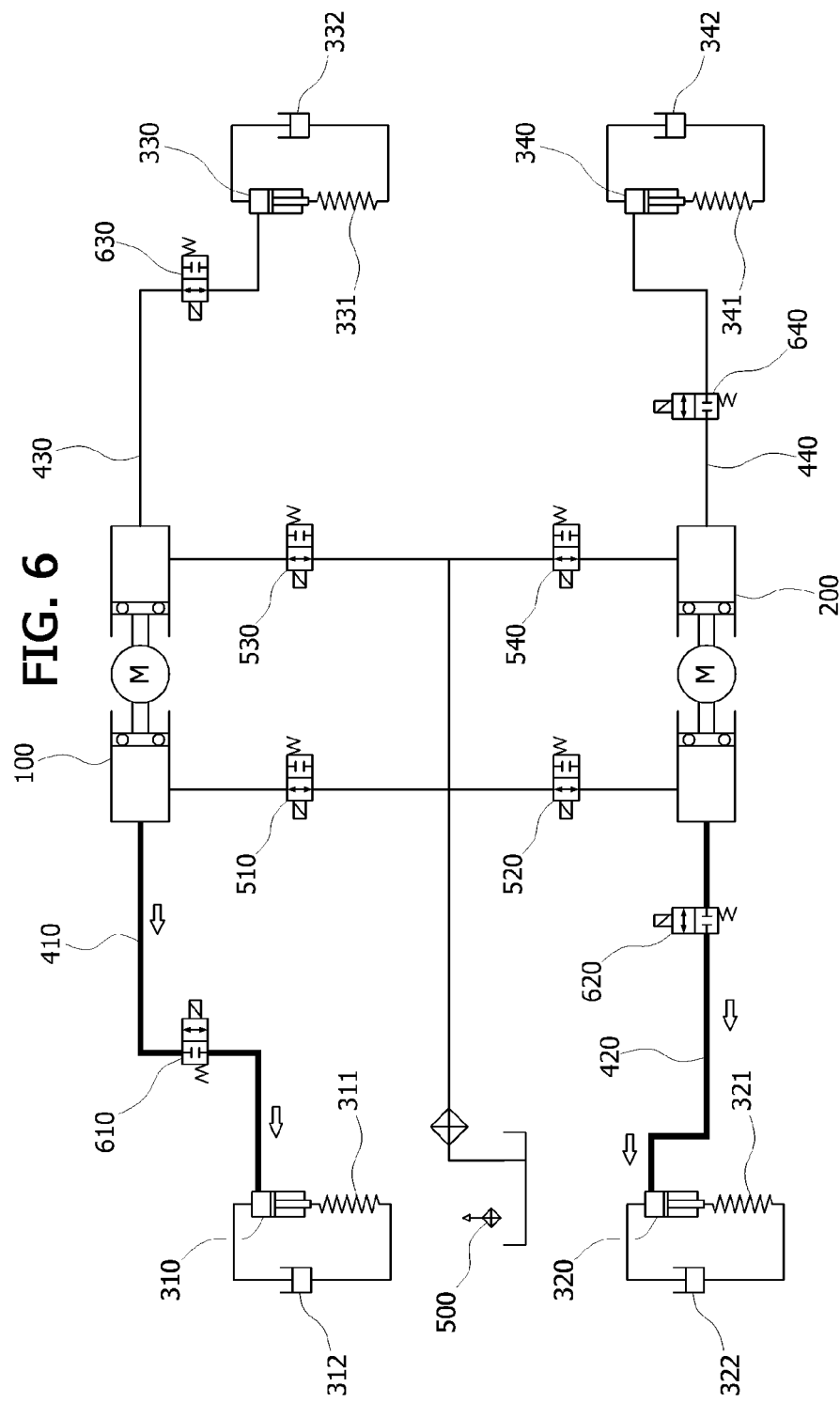
FIGS. 6 and 7 are circuit diagrams illustrating situational flows of a fluid in the active suspension apparatus according to an embodiment of the present invention.
Figure 7:
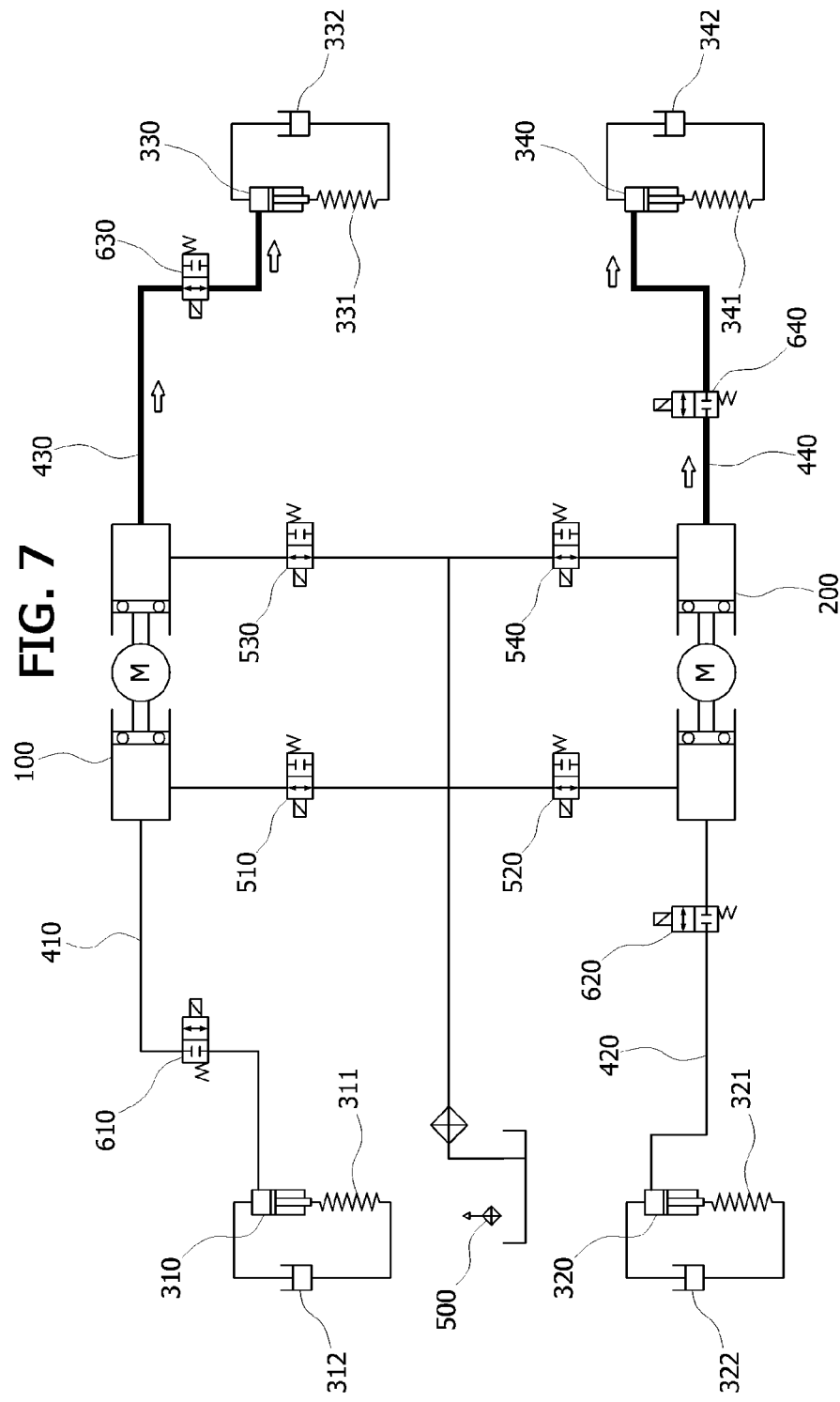

Hereinafter, the movement of the fluid depending on the driving of the pumps 100 and 200 in the active suspension apparatus according to an embodiment of the present invention will be described with reference to FIGS. 6 and 7. FIGS. 6 and 7 are circuit diagrams illustrating situational flows of the fluid in the active suspension apparatus according to an embodiment of the present invention.

Referring to FIG. 6, a flow of the fluid when the fluid is supplied to the actuators 310 and 320 of the left wheels of the vehicle will be described. The electronic control unit controls the operation of the first pump 100 based on road surface information input from sensors of the vehicle or settings of a user. In detail, the electronic control unit rotates the first ball screw 131 and the second ball screw 132 in the one direction by driving the motor 110 of the first pump 100, thereby moving the first piston 141 and the second piston 142 toward the one side of the cylinder 120. Here, the fluid contained inside the one side of the cylinder 120 is discharged by pressure generated by the first piston 141 to the first flow channel 410 through the first outlet 161. Herein, the electronic control unit controls the first valve 610 to open the first flow channel 410, thereby moving the fluid from the first pump 100 to the actuator 310 of the left front wheel. Similarly, operations of the second pump 200 and the second valve 620 are controlled by the electronic control unit, and based thereon, the fluid moves from the second pump 200 to the actuator 320 of the left rear wheel. Details thereof are identical to the movement of the fluid between the first pump 100 and the actuator 310 of the left front wheel. Through a process described above, it is possible to generate hydraulic pressure in the actuators 310 and 320 of the left front/rear wheels.

On the other hand, referring to FIG. 7, a flow of the fluid when the fluid is supplied to the actuators 330 and 340 of the right wheels of the vehicle will be described. The electronic control unit controls the operation of the first pump 100 based on road surface information input from the sensors of the vehicle or settings of the user. In detail, the electronic control unit rotates the first ball screw 131 and the second ball screw 132 in the other direction by driving the motor 110 of the first pump 100, thereby moving the first piston 141 and the second piston 142 toward the other side of the cylinder 120. Here, the fluid contained inside the other side of the cylinder 120 is discharged by pressure generated by the second piston 142 to the third flow channel 430 through the second outlet 162. Herein, the electronic control unit controls the third valve 630 to open the third flow channel 430, thereby moving the fluid from the first pump 100 to the actuator 330 of the right front wheel. Similarly, operations of the second pump 200 and the fourth valve 640 are controlled by the electronic control unit, and based thereon, the fluid moves from the second pump 200 to the actuator 340 of the right rear wheel. Details thereof are identical to the movement of the fluid between the first pump 100 and the actuator 330 of the right front wheel. Through a process described above, it is possible to generate hydraulic pressure in the actuators 330 and 340 of the right front/rear wheels.

As described above, the fluid may be supplied to the actuators 310 and 320 of the left front/rear wheels and the actuators 330 and 340 of right front/rear wheels at the same time. However, since the first pump 100 and the second pump 200 may be independently driven, the first pump 100, the second pump 200, the valves 610, 620, 630, and 640 are properly controlled when necessary, thereby transferring hydraulic pressure only to one of the four actuators 310, 320, 330, and 340.

Figure 8:
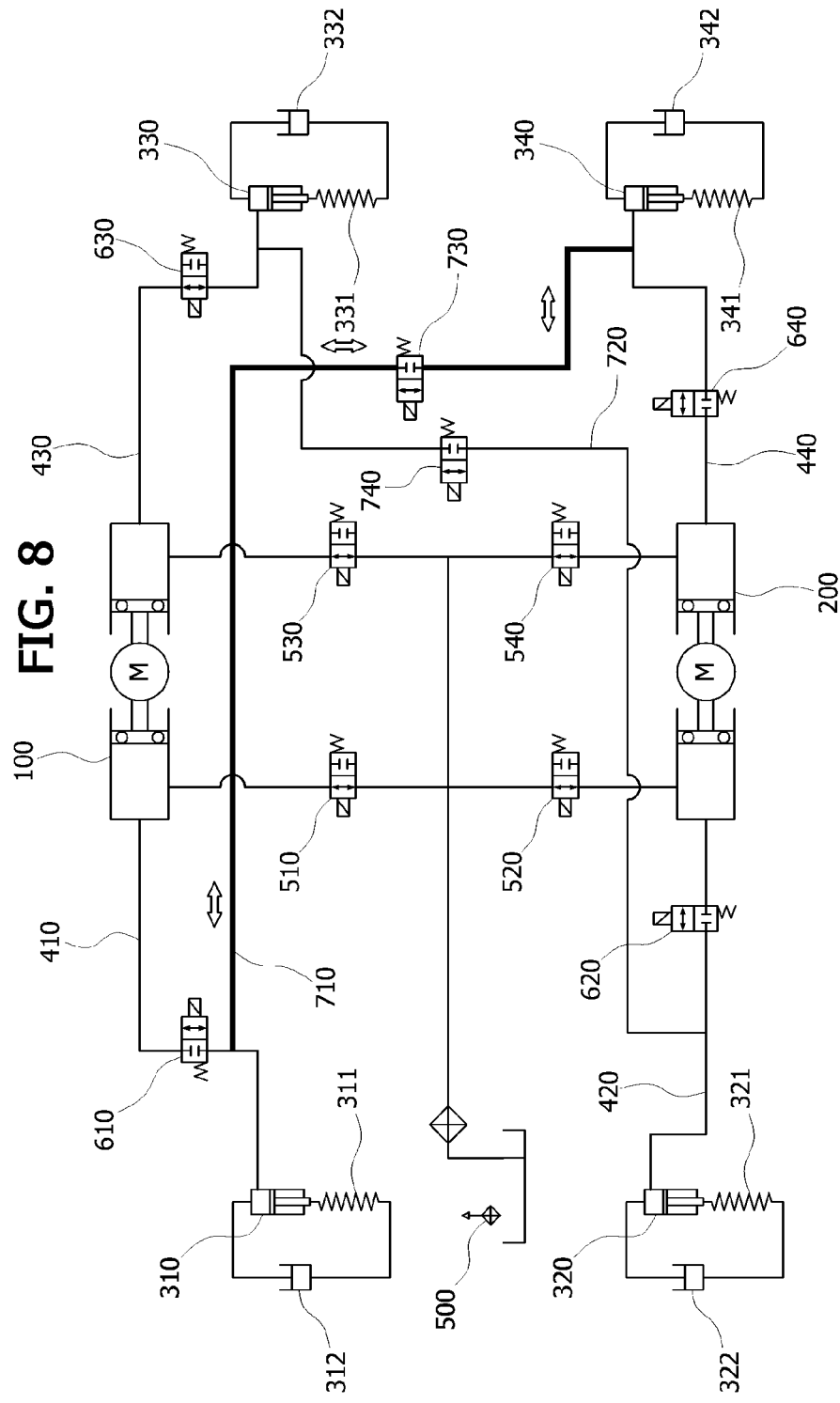
FIGS. 8 and 9 are circuit diagrams illustrating situational flows of a fluid in the active suspension apparatus according to another embodiment of the present invention.
Figure 9:
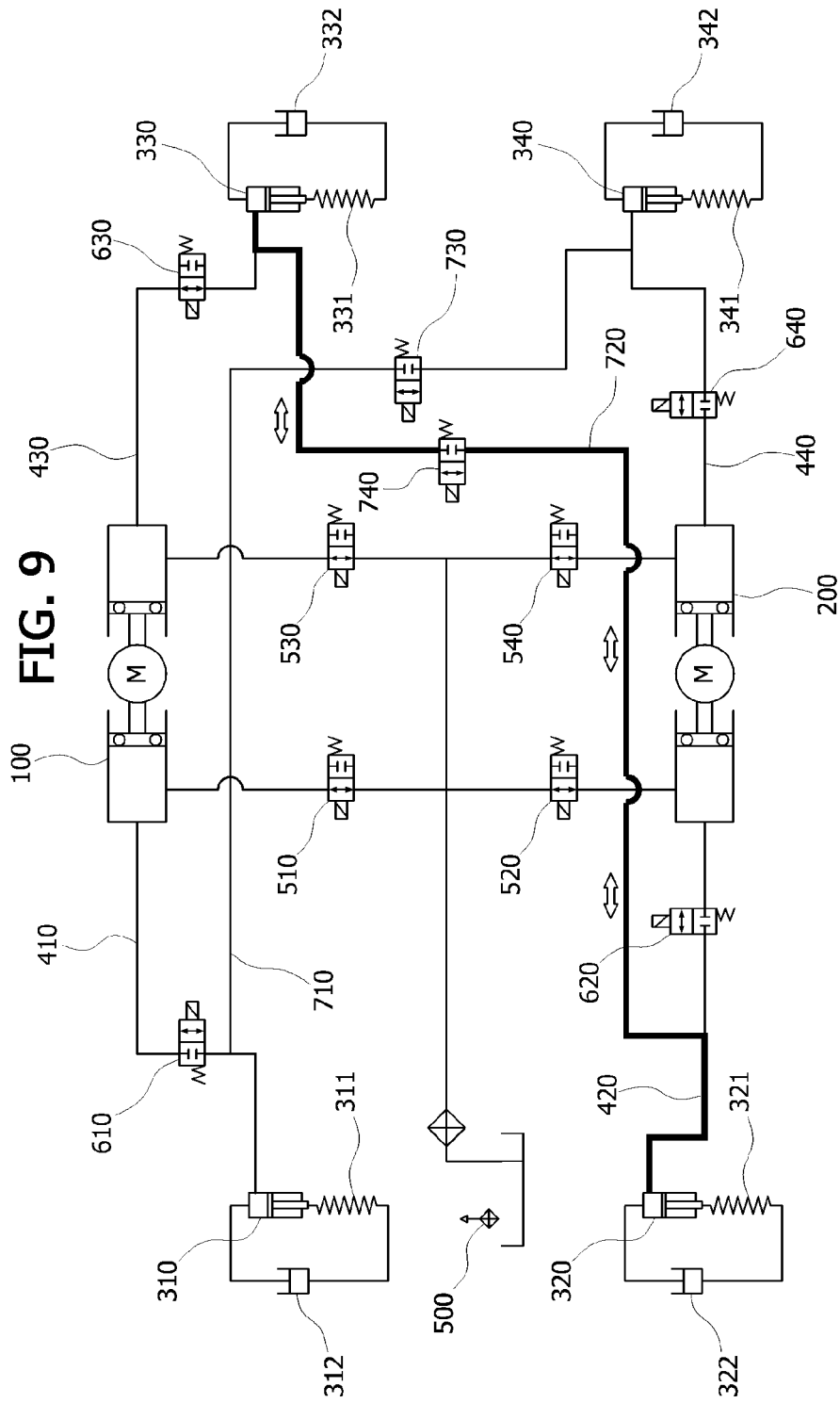

Hereinafter, a flow of a fluid in an active suspension apparatus for a vehicle according to another embodiment of the present invention will be described with reference to FIGS. 8 and 9. FIGS. 8 and 9 are circuit diagrams illustrating situational flows of the fluid in the active suspension apparatus according to another embodiment of the present invention.

As described above, compared with the active suspension apparatus according to an embodiment of the present invention, the active suspension apparatus according to another embodiment of the present invention further includes the first intersection flow channel 710 for movements of the fluid between the actuator 310 of the left front wheel of the vehicle and the actuator 340 of the right rear wheel of the vehicle and the second intersection flow channel 720 for movements of the fluid between the actuator 330 of the right front wheel of the vehicle and the actuator 320 of the left rear wheel of the vehicle.

Due to technical features described above, as shown in FIG. 8, through the first intersection flow channel 710, hydraulic pressure of the actuator 310 of the left front wheel may be transferred to the actuator 340 of the right rear wheel, and on the contrary, hydraulic pressure of the actuator 340 of the right rear wheel may be transferred to the actuator 310 of the left front wheel. Similarly, as shown in FIG. 9, through the second intersection flow channel 720, hydraulic pressure of the actuator 330 of the right front wheel may be transferred to the actuator 320 of the left rear wheel, and on the contrary, hydraulic pressure of the actuator 320 of the left rear wheel may be transferred to the actuator 330 of the right front wheel.

As a result, when an intersection function described above is applied, it is possible to transfer an unnecessary hydraulic pressure source to a part which needs the same to be used therein. Through this, energy consumption caused by unnecessary motor operation may be reduced, thereby increasing overall system efficiency. In addition, the electronic control unit appropriately controls the auxiliary valves 730 and 740 which control the opening and closing of the first intersection flow channel 710 and the second intersection flow channel 720 to maximize the effects described above.

According to one embodiment of the present invention, an active suspension apparatus for a vehicle is provided using a motor-and-cylinder-based pump, in which since the pump is operated by driving a motor in a system only when necessary, it is possible to timely generate only necessary pressure, thereby increasing an output of an engine and improving fuel efficiency.

In addition, since an on/off valve is applied instead of a proportional control valve as a valve for controlling movements of a fluid, not only competitiveness in manufacturing costs but also overall simplification of the system may be provided.

The effects of the present invention are not limited to the above disclosure; other effects not mentioned above may become apparent to those of ordinary skill in the art based on the above-described descriptions.

The embodiments and the attached drawings are merely examples which exemplarily illustrate a part of the technical concept of the present invention. Accordingly, since the embodiments disclosed herein are not to limit the technical concept of the present invention but to describe the same, it is obvious that the scope of the technical concept of the present invention is not limited to the embodiments. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An active suspension apparatus for a vehicle, comprising:
    actuators configured to compensate displacements of coil springs connected to wheels of the vehicle;
    a first pump configured to supply a fluid to one of the actuators of left and right front wheels of the vehicle among the actuators; and
    a second pump configured to supply a fluid to one of the actuators of left and right rear wheels of the vehicle among the actuators,
    wherein the fluid contained in one of cylinders of the first pump and the second pump is supplied to at least one of the actuators based on driving of a motor.

2. The active suspension apparatus of claim 1, wherein each of the first pump and the second pump is independently operated.

3. The active suspension apparatus of claim 1, further comprising:
    a first flow channel and a third flow channel configured to connect the first pump with the actuators of the left and right front wheels of the vehicle; and
    a second flow channel and a fourth flow channel configured to connect the second pump with the actuators of the left and right rear wheels of the vehicle,
    wherein a valve configured to open and close a flow channel is disposed on at least one of the first flow channel, the second flow channel, the third flow channel, and the fourth flow channel.

4. The active suspension apparatus of claim 1, further comprising:
- a first intersection flow channel configured to be for movements of the fluid between the actuator on the left front wheel and the actuator on the right rear wheel; and
- a second intersection flow channel configured to be for movements of the fluid between the actuator on the right front wheel and the actuator on the left rear wheel.

5. The active suspension apparatus of claim 4, wherein an auxiliary valve configured to control the movements of the fluid is disposed on at least one of the first intersection flow channel and the second intersection flow channel.

6. The active suspension apparatus of claim 1, wherein one of the first pump and the second pump comprises:
- a first ball screw and a second ball screw configured to be disposed on one side and the other side of the cylinder, respectively, and to rotate based on the driving of the motor; and
- a first piston and a second piston configured to linearly reciprocate inside the cylinder based on the rotation of the first ball screw and the second ball screw.

7. The active suspension apparatus of claim 6, wherein the first ball screw and the second ball screw rotate on the same shaft, and
wherein when the first ball screw and the second ball screw rotate due to the driving of the motor in one of one direction and the other direction, the first piston and the second piston move toward one of the one side and the other side of the cylinder and supply the fluid contained in one of the one side and the other side of the cylinder to one of the actuators of the left wheels and the actuators of the right wheels.

8. The active suspension apparatus of claim 6, wherein one of the first pump and the second pump further comprises a restoring unit configured to support at least one of the first piston and the second piston.

* * * * *